Figure 1:
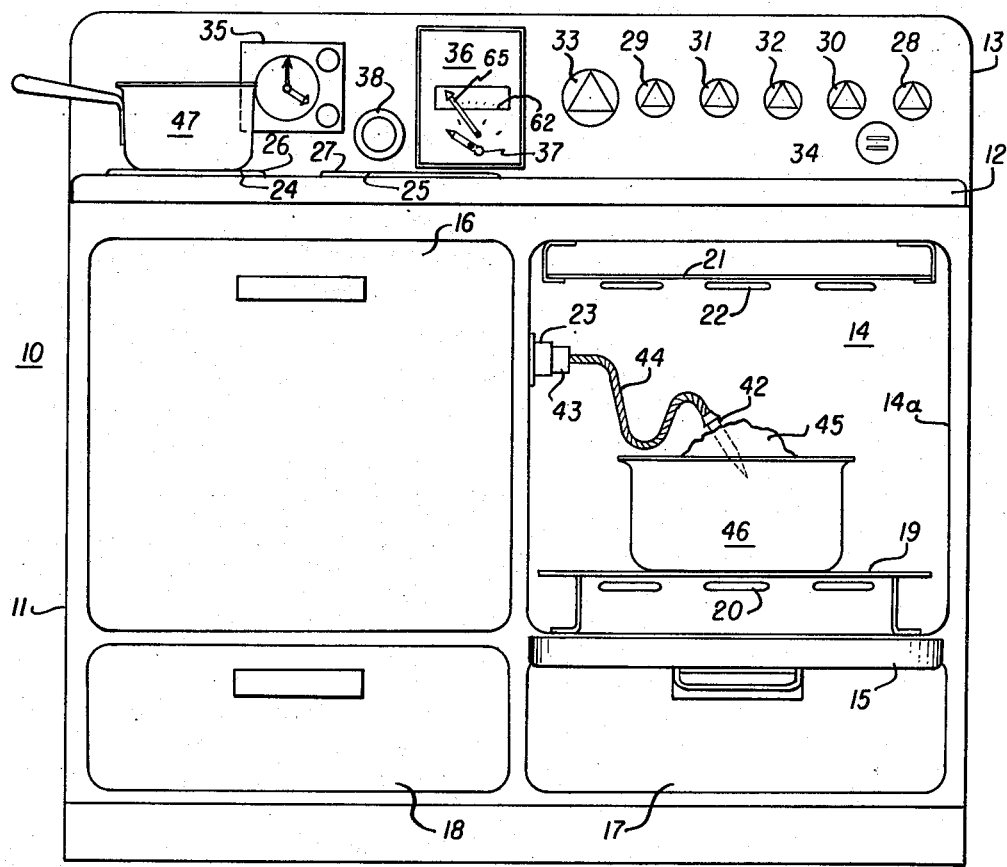

Nov. 3, 1953     G. W. SCHROEDER     2,657,580
MULTIRANGE RESISTANCE THERMOMETER

Filed Nov. 2, 1951     3 Sheets-Sheet 1

INVENTOR.
George W. Schroeder
BY
Smith, Olsen & Baird
Attys.

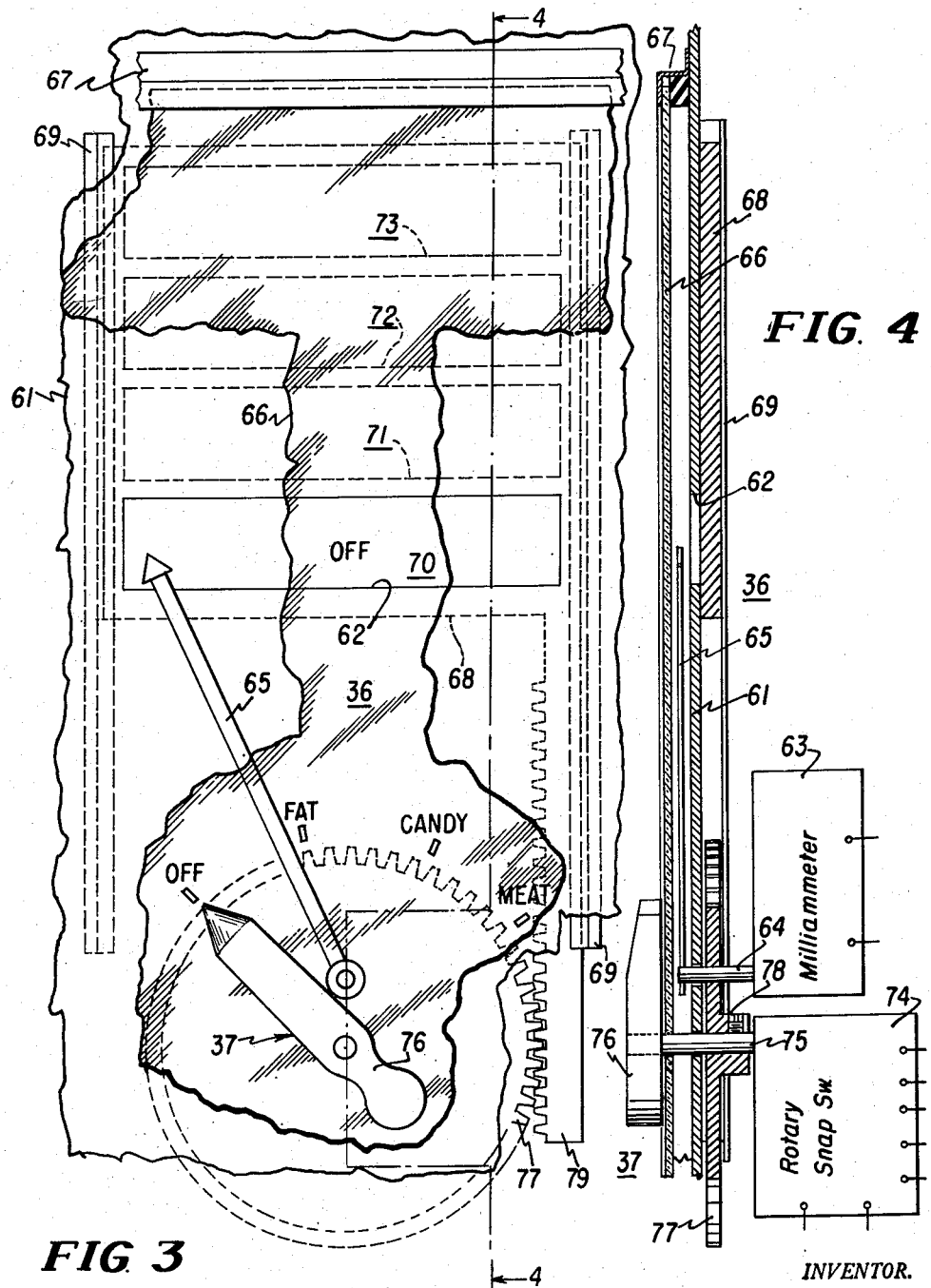

INVENTOR.
George W. Schroeder
BY
Smith, Olsen + Baird
Attys.

Patented Nov. 3, 1953

2,657,580

UNITED STATES PATENT OFFICE 2,657,580

MULTIRANGE RESISTANCE THERMOMETER

George W. Schroeder, Louisville, Ky., assignor to General Electric Company, a corporation of New York Application November 2, 1951, Serial No. 254,558

7 Claims. (Cl. 73—362)

The present invention relates to electric ranges provided with electrical temperature indicating systems.

In the cooking of roasts and other cuts of meats in the oven of an electric range, it is conventional practice to insert a mechanical thermometer into the roast so that the cook may determine when the interior of the roast has reached a predetermined temperature indicating that the cooking of the roast has proceeded a corresponding degree from the raw state into a rare, medium or well-done condition. Similarly in carrying out a fat-frying or a candy-making cooking operation in a vessel that is heated on the hot plate carried by the cooking top of the electric range, it is conventional practice to insert a mechanical thermometer into the vessel so that the temperature of the fat or of the candy syrup may be determined and maintained during the cooking operation.

While these arrangements are reasonably satisfactory, considerable care must be exercised by the cook in carrying out the cooking operations in order to obtain good cooking results. Also it is quite difficult for the cook accurately to read the thermometers involved in these operations due to the presence of steam, vapor, etc., issuing from the food being cooked. Moreover, in carrying out the cooking of a roast, the cook must repeatedly open the oven door and slide the roast from the oven chamber in order to render visible the thermometer that has been inserted thereinto.

It is a general object of the present invention to provide an electric temperature indicating system including a temperature responsive electrical element, an electric meter provided with a number of scales, a circuit network provided with a number of positions respectively matching the electrical element to the different scales of the meter, and a single manually controlled member for selecting any one of the scales of the meter and for simultaneously setting the circuit network into the corresponding one of its circuit positions.

Another object of the invention is to provide an electric temperature indicating system that includes an Edison three-wire alternating current source and an improved arrangement for operating therefrom a voltage amplifier and a power amplifier so that the temperature of a temperature sensing resistor may be directly read upon an electric current meter.

A further object of the invention is to provide an electric temperature indicating system of the character noted that incorporates an arrangement for preventing the outputs of the amplifiers from increasing proportionally with an increase in voltage above normal between the outside conductors of the three-wire Edison source.

Further features of the invention pertain to the particular arrangement of the elements of the electrical temperature indicating system, whereby the above-outlined and additional operating features thereof are attained.

Figure 2:
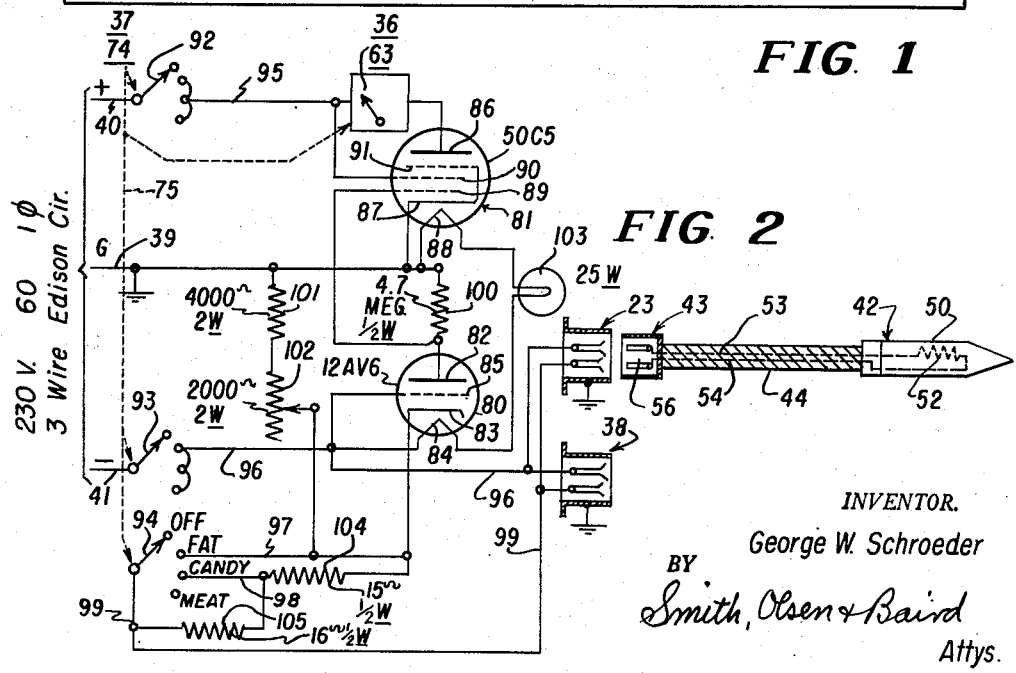
Figure 5:
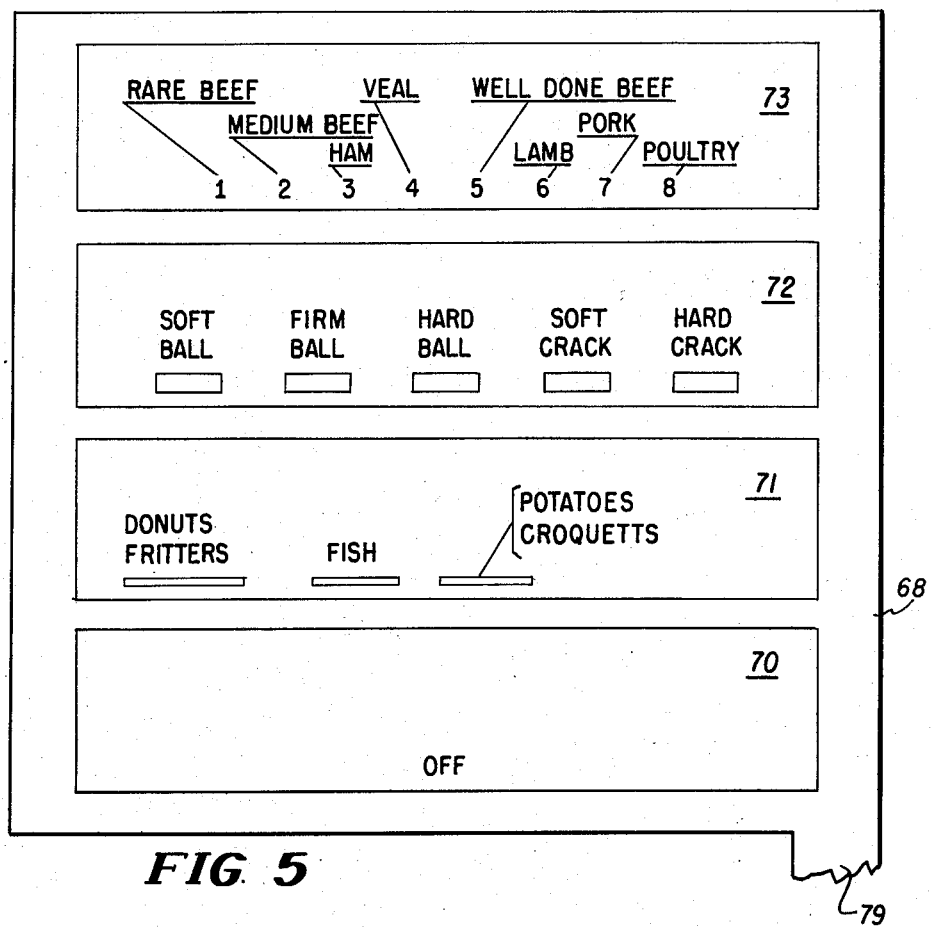
Figure 6:
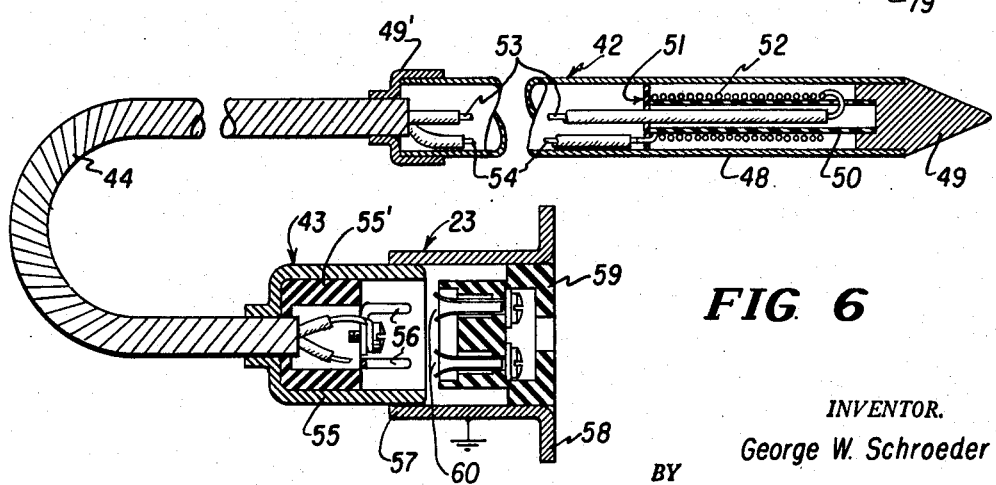

The invention, both as to its organization and method of operation, together with further objects and advantages thereof, will best be understood by reference to the following specification taken in connection with the accompanying drawings, in which Figure 1 is a front elevational view of an electric range incorporating an electrical temperature indicating system and embodying the present invention; Fig. 2 is an electrical diagram of the circuit arrangement of the elements of the temperature indicating system incorporated in the electric range; Fig. 3 is an enlarged fragmentary front elevational view, partly broken away, of a portion of the electric temperature indicating meter and the circuit controller incorporated in that indicating system; Fig. 4 is an enlarged fragmentary sectional view, taken in the direction of the arrows along the offset line 4—4 in Fig. 3, of the portion of the electric temperature indicating meter and the circuit controller; Fig. 5 is a further enlarged fragmentary front elevational view of the movable scale carrying member that is incorporated in the electric temperature indicating meter shown in Figs. 3 and 4; and Fig. 6 is an enlarged fragmentary view, partly in section, of the temperature sensing probe and connected flexible armored cable and circuit connector arrangement that is incorporated in the electrical temperature indicating system, as shown in Figs. 1 and 2.

Referring now to Fig. 1 of the drawings, the electric range 10 there illustrated and incorporating the electrical temperature indicating system embodying the features of the present invention comprises an upstanding metal body 11 that is provided with a substantially horizontally disposed metal cooking top 12 which terminates adjacent to the rear edge thereof in a laterally extending upstanding hollow metal backsplash 13. The body 11 houses in the upper right-hand portion thereof a broiling and baking oven cavity or chamber 14, which oven chamber 14 is provided with a door 15 that is hinged adjacent to the lower edge thereof and movable between open and closed positions, the door 15 being illustrated in its open position. Also the body 11 may house in the upper left-hand portion thereof a longitudinally slidable drawer that is provided with a front panel 16 substantially matching the door 15 in its closed position. Finally the body 11 may house in the lower right-hand portion thereof and in the lower left-hand portion thereof two longitudinally slidable drawers that are respectively provided with front panels 17 and 18 respectively disposed below the door 15 and below the panel 16.

Arranged in the lower portion of the oven cavity 14 is a longitudinally slidable and removable supporting rack 19 carrying an electric heating unit 20 that is preferably of the sheathed resistance conductor type; and arranged in the upper portion of the oven cavity 14 is a longitudinally slidable and removable rack 21 carrying an electric heating unit 22 that is preferably of the sheathed resistance conductor type. The heating units 20 and 22 are provided with electrical terminal structures, not shown, that are respectively received in electrical receptacles, not shown, supported by the rear wall of the metal liner or shell 14a that defines the oven cavity 14 in a conventional manner. Also the left-hand wall of the liner 14 carries adjacent to the door 15 and within the oven chamber 14 an electrical connector or receptacle 23 that comprises a portion of the electrical temperature indicating system incorporated in the electric range 10, as explained more fully hereinafter.

The cooking top 12 carries on the left-hand side thereof, four electric hot plates 24, 25, 26 and 27, arranged in a rectangular pattern in a conventional manner, the hot plates 24 and 25 being respectively arranged in left front and right front positions, and the hot plates 26 and 27 being respectively arranged in left rear and right rear positions. Preferably the right-hand side of the cooking top 12 is uninterrupted to provide a suitable work supporting surface.

The backsplash 13 supports on the right-hand side thereof an oven switch 28 and four hot plate switches 29, 30, 31 and 32 individual to the respective hot plates 24, 25, 26 and 27 for the usual circuit control functions, as well as a conventional oven temperature regulating thermostatic switch 33 and receptacle outlet 34. Also the backsplash 13 supports on the left-hand side thereof the usual electric oven timer switch 35 of the clock-controlled type for the purpose of controlling operation of the heating units 20 and 22 in the oven chamber 14 upon a time basis. Finally the central portion of the backsplash 13 supports an electric temperature indicating meter 36, a cooperating circuit controller 37, and an associated electrical connector or receptacle 38, the elements 36, 37 and 38 forming a part of the electrical temperature indicating system incorporated in the electric range 10, as explained more fully hereinafter. Further the electric range 10 is provided with a three-wire Edison supply circuit that is preferably of 230 volts, 60 cycles, single phase A. C., the supply circuit including the usual grounded neutral conductor 39 and two ungrounded outside conductors 40 and 41, as indicated in Fig. 2.

Further the temperature indicating system comprises, as illustrated in Figs. 1, 2 and 6, an elongated substantially cylindrical metal temperature sensing probe 42 that is connected to an electrical connector or plug 43 by a suitable length of flexible metal armored cable 44, the plug 43 being selectively connectible to the receptacles 23 and 38 for the purpose of selectively associating the temperature sensing probe 42 respectively with the oven chamber 14 and with the backsplash 13. More particularly when the plug 43 is inserted into the cooperating receptacle 23 the temperature sensing probe 42 is operatively connected into the electrical temperature indicating system, and at this time the flexible armored cable 44 permits the ready insertion of the probe 42 into a roast of meat indicated at 45 supported in a suitable roasting pan indicated at 46 and supported upon the lower rack 19 arranged in the oven chamber 14. At this time the temperature of the probe 42 is readable upon the electrical temperature indicating meter 36 after appropriate setting of the cooperating circuit controller 37 in a manner more fully explained hereinafter, whereby the oven cooking operation may be readily observed by the cook in an obvious manner. On the other hand, when the plug 43 is inserted into the cooperating receptacle 38, the temperature sensing probe 42 is operatively connected into the electrical temperature indicating system, and at this time the flexible armored cable 44 permits ready insertion of the probe 42 into food being cooked in a saucepan or other vessel 47 supported by one of the hot plates 24, etc., carried by the cooking top 12. At this time the temperature of the probe 42 is readable upon the electrical temperature indicating meter 36 after appropriate setting of the cooperating circuit controller 37 in a manner more fully explained hereinafter, whereby the hot plate cooking operation may be readily observed by the cook in an obvious manner.

Suitable constructional details of the probe 42, the armored cable 44, the plug 43, and the receptacle 23 are shown in Fig. 6. More specifically the probe 42 comprises an elongated cylindrical casing 48 formed of "Invar," a nickel-steel alloy consisting essentially of approximately 36–40% nickel and 60–64% iron, or other metal having a low thermal conductivity, and a pointed tip or arbor 49 formed of aluminum or other metal having a high thermal conductivity, the inner end of the arbor 49 being suitably secured in the outer end of the casing 48. The inner end of the casing 48 is closed by a ferrule 49' that may be formed of "Invar" and suitably secured to the metal armor of the flexible cable 44. A tube 50 is suitably supported in the outer end of the casing 48 between the arbor 49 and an adjacent washer 51, the tube 50 and the washer 51 being formed of lava or other suitable electrical insulating material. A temperature sensing resistor 52 is wound upon the tube 50 and housed within the outer end of the casing 48, the resistor 52 being arranged in good heat-conducting relation with the arbor 49. The temperature sensing resistor 52 has a high positive coefficient of resistance and preferably consists of about 5-ft. of No. 40 "Hytemco" oxide coated wire, a nickel-steel alloy that consists essentially of approximately 70% nickel and 30% iron. The resistor 52 has a very nearly linear temperature versus resistance characteristic between 70° and 1300° F.; the electrical resistance thereof at 1300° F. being substantially five times that at 70° F. The resistor 52 has a resistance of 50 ohms and the opposite terminals thereof are electrically connected to a pair of electrically insulated conductors 53 and 54 extending into the adjacent end of the armored cable 44.

The plug 43 consists essentially of a substantially cylindrical metal outer shell 55 that is suitably joined to the metal armor of the adjacent end of the cable 44 and houses a block of electrical insulating material 55' that supports a pair of electrical plug prongs 56 connected to the adjacent ends of the pair of conductors 53 and 54 disposed in the armored cable 44. Similarly the receptacle 23 consists essentially of a substantially cylindrical metal outer shell 57 provided with a supporting flange 58 and housing a block of electrical insulating material 59 that supports a pair of electrical jack prongs 60. It will be understood that the supporting flange 58 is suitably secured to the adjacent wall of the metal liner 14a of the oven cavity 14 grounding the shell 57 to the frame of the electric range 10. When the plug 43 is inserted into the receptacle 23, the shells 55 and 57 make good electrical contact with each other grounding out the armor of the cable 44 and the exterior of the probe 42 and completing an electric circuit between the exterior and the resistor 52 via the prongs 56 and 60 and the conductor pair 53—54. This arrangement positively prevents any potentials impressed from the exterior upon the resistor 52 from appearing upon the exterior of the plug 43, the armored cable 44 or the probe 42, so that there is no danger of electrical shocks to the cook incident to handling the probe 42 and placement and removal of the plug 43 with respect to the receptacle 23.

In view of the foregoing description of the construction and arrangement of the receptacle 23 carried by the wall of the metal oven liner 14a, it will be understood that the receptacle 38 carried by the metal backsplash 13 is identical, whereby the plug 43 may be readily inserted into the receptacle 38 so as to connect the resistor 52 into an exterior circuit and to ground out the armored cable 44 and the probe 42 upon the grounded receptacle 38 via the metal backsplash 13 and the metal frame of the range 10.

Suitable constructional details of the electrical temperature indicating meter 36 and the circuit controller 37 are shown in Figs. 3, 4 and 5. More specifically the meter 36 comprises an opaque face plate 61 having a window 62 formed therethrough, which face plate 61 preferably comprises a portion of the metal sheet constituting the front of the backsplash 13; also the meter 36 includes an electroresponsive D. C. milliammeter 63 having a range 0–24 milliamperes and disposed behind the face plate 61. The milliammeter 63 is provided with a rotatably mounted shaft 64 projecting through an associated hole formed in the face plate 61 and carrying an indicator 65, the outer end of which cooperates with the window 62 formed in the face plate 61. Preferably the face plate 61 and the indicator 65 disposed adjacent to the face thereof are covered by a rectangular pane of glass 66, which is suitably supported in a rectangular frame 67 carried by the face plate 61 in order to protect the indicator 65 against accidental damage from the exterior. Also the meter 36 comprises an indicator slide 68 arranged upon the rear of the face plate 61 and mounted upon a pair of laterally spaced-apart guide elements 69 secured to the rear of the face plate 61. As best shown in Fig. 5, the indicator slide 68 comprises four vertically spaced-apart indicator scales 70, 71, 72 and 73 on the front thereof that selectively cooperate with the window 62 formed in the face plate 61. More specifically the scale 70 comprises an off scale and carries the simple legend "off"; the scale 71 comprises a fat scale and carries the appropriate legends "fish," etc., indicated corresponding to fat frying cooking operations; the scale 72 comprises a candy scale and carries the appropriate legends "hard ball," etc., indicated corresponding to candy cooking operations; and the scale 73 comprises a meat scale and carries the appropriate legends "veal," etc., indicated corresponding to meat cooking operations.

The circuit controller 37 consists essentially of a suitable four-postition rotary snap switch 74 disposed rearwardly of the face place 61 and provided with a rotatably mounted shaft 75 extending through aligned holes respectively formed in the face plate 61 and in the glass pane 66, the outer end of the shaft 75 carrying a manually operable handle 76. The outer end of the manually operable handle 76 constitutes an index pointer that cooperates with circumferentially spaced-apart indicia "off," "fat," "candy" and "meat" provided on the adjacent surface of the glass pane 66. In view of the foregoing, it will be understood that the handle 76 is selectively rotatable into the four positions noted, whereby the pointer provided on the outer end thereof cooperates with the respective legends "off," etc., noted, and the snap switch 74 is operated into its corresponding and respective electrical off, etc., positions. Also a gear 77 is rigidly fixed to the shaft 75 by an arrangement including a set screw 78, the gear 77 being disposed behind the face plate 61 and cooperating with a rack 79 formed on the right-hand side of the indicator slide 68 as an integral part thereof. This arrangement provides a positive drive between the shaft 75 of the circuit controller 37 and the indicator slide 68, whereby the scales 70, etc., provided on the indicator slide 68 are respectively framed in the window 62 provided in the face plate 61 when the handle 76 is respectively operated into its corresponding positions. Specifically as illustrated in Figs. 3 and 4, when the handle 76 occupies its "off" position, the cooperation between the gear 77 and the rack 79 brings the off scale 70 provided on the indicator slide 68 into registry with the window 62. As the handle 76 is moved into its successive positions in the clockwise direction, as viewed in Fig. 3, the gear 77 cooperating with the rack 79 lowers the indicator slide 68 successively framing the scales 71, 72 and 73 in the window 62. In passing, it is noted that the scale spread of each of the scales 71, 72 and 73 carried by the indicator slide 68 comprises approximately 100° F.; the fat cooking operations normally extending from approximately 320° to 420° F.; the candy cooking operations normally extending from approximately 220° to 320° F.; and the meat cooking operations normally extending from approximately 120° to 220° F.

Referring now to Fig. 2, the circuit network that operatively interconnects the three-wire Edison source, the electrical temperature indicating meter 36, the circuit controller 37, the temperature sensing resistor 52 housed in the probe 42, the plug 43, and one of the receptacles 23 or 38 also comprise two electron discharge devices 80 and 81. The electron discharge device or tube 80 constitutes a triode that is preferably of the 12AV6 type and is connected as a voltage amplifier; and the electron discharge device or tube 81 constitutes a pentode that is preferably of the 50C5 type and is connected as a power amplifier. More particularly, the tube 80 comprises an anode or plate 82, a cathode 83 of the thorium, etc., oxide coated type provided with a heater 84, and a control grid 85; and the tube 81 comprises an anode or plate 86, a cathode 87 of the thorium, etc., oxide coated type provided with a heater 88, a control grid 89, a screen grid 90 and a suppressor grid 91.

In the arrangement of the meter 36, the position of the indicator 65 upon the shaft 64 is such that the response of the milliammeter 63 is depressed by 4 milliamperes so that the indicator 65 reads over the full range of the selected scales 71, etc., in response to current traversing the milliammeter 63 over the range 4–24 milliamperes, since the grid voltage versus plate current characteristic of the tube 81 is substantially linear over the plate current range 4–24 milliamperes, whereby the scales 71, etc., are substantially linear when calibrated in degrees F., as explained more fully hereinafter.

In the circuit network the snap switch 74 of the circuit controller 37 comprises 3 rotary blades 92, 93 and 94 that are commonly mounted upon the rotatable shaft 75 thereof, the two outside conductors 40 and 41 of the Edison source being respectively connected to the two blades 92 and 93. In Fig. 2, the ganging of the blades 92, 93 and 94 of the snap switch 74 and of the control of the scales of the temperature indicating meter 36 is indicated by the broken lines 75 representing the rotatably mounted shaft 75 shown in Figs. 3 and 4. Each of the blades 92, 93 and 94 is provided with four contacts in the individually associated contact banks thereof and respectively corresponding to the four positions "off," "fat," "candy" and "meat" of the circuit controller 37. The fat, candy and meat contacts associated with the blade 92 commonly terminate a conductor 95; the fat, candy and meat contacts associated with the blade 93 commonly terminate a conductor 96; the fat and candy contacts associated with the blade 94 respectively terminate two conductors 97 and 98; and the blade 94 terminates a conductor 99.

The plate 82 of the tube 80 is connected to one terminal of a resistor 100 of approximately 4.7 megohms and ½ watt, the other terminal of the resistor 100 being connected to the neutral conductor 39; the control grid 85 of the tube 80 is directly connected to the conductor 96; and the cathode 83 of the tube 80 is directly connected to the conductor 97. Two resistors 101 and 102 are connected in series circuit relation between the neutral conductor 39 and the conductor 97, the resistor 102 being adjustable, the resistor 101 being of 4000 ohms and 2 watts and the resistor 102 being of 2000 ohms and 2 watts. The plate 86 of the tube 81 is directly connected to one terminal of the milliammeter 63, the other terminal of the milliammeter 63 being directly connected to the conductor 95; the cathode 87 of the tube 81 is directly connected to the neutral conductor 39; the control grid 89 of the tube 81 is directly connected to the junction between the one terminal of the resistor 100 and the plate 82 of the tube 80; the screen grid 90 of the tube 81 is directly connected to the conductor 95; and the suppressor grid 91 of the tube 81 is directly connected to the cathode 87 thereof.

The heaters 84 and 88 of the respective tubes 80 and 81 are connected in series circuit relation between the neutral conductor 39 and the conductor 96 via a ballast resistor 103 in the form of a 25 watt lamp having a high positive temperature coefficient of resistance, for a purpose more fully explained hereinafter. Also a resistor 104 of 15 ohms and ½ watt is connected between the conductors 97 and 98; and a resistor 105 of 16 ohms and ½ watt is connected between the conductors 98 and 99. The conductors 96 and 99 are connected in multiple to the pairs of jack prongs arranged in the receptacles 23 and 38 so that the temperature sensing resistor 52 is connected via the conductors 53 and 54 across the conductors 96 and 99 when the plug 43 is inserted either into the receptacle 23 or into the receptacle 38. The tubes 80 and 81 and the other electrical elements 63, 74, 101, etc., may be suitably mounted within the hollow backsplash 13.

Considering now the operation of the circuit network of Fig. 2, and assuming that the cook desires to carry out a meat roasting operation in the oven chamber 14, the cook prepares the roast of meat 45, places it in the vessel 46, inserts the probe 42 into the roast of meat 45, places the vessel 46 upon the supporting rack 19 in the oven chamber 14, and inserts the plug 43 into the associated receptacle 23. The oven door 15 is then closed and the handle 76 of the circuit controller 37 is rotated from its "off" position into its "meat" position effecting setting of the switch blades 92, 93 and 94 into their corresponding meat positions and effecting setting of the indicator slide 68 so that the meat scale 73 is rendered visible in the window 62 of the face plate 61. The cook then sets the thermostatic oven temperature regulator 33 to the desired temperature that she wishes to hold in the oven chamber 14. Finally the cook operates the oven switch 28 in order to effect energization of the electric heating units 20 and 22 bringing about heating of the oven chamber 14 in the usual manner. At this time the outside conductors 40 and 41 of the Edison source are respectively connected to the conductors 95 and 96 since the blades 92 and 93 occupy their meat positions; and the series circuit is completed between the neutral conductor 39 and the outside conductor 41 of the Edison source via the resistors 101 and 102, the conductor 97, the resistor 104, the conductor 98, the resistor 105, the conductor 99, the conductor 54, the temperature sensing resistor 52 and the conductors 53 and 96. Since the cathode 83 of the tube 80 is connected to the conductor 97 and consequently to an intermediate point in the above-traced circuit, a negative bias is produced between the control grid 85 and the cathode 83 of the tube 80 when the voltage applied between the neutral conductor 39 and the outside conductor 41 is positive at the neutral conductor 39, whereby during positive loops of the Edison source the tube 80 is rendered conductive so that current flows in the plate-cathode circuit thereof through the resistor 100. Also at this time, a negative bias is produced between the control grid 89 and the cathode 87 of the tube 81 by virtue of the voltage drop across the resistor 100, whereby during positive loops of the Edison source, the tube 81 is rendered conductive so that current flows in the plate-cathode circuit thereof through the milliammeter 63.

As the temperature of the roast of meat 45 rises in the heated oven chamber 14, the temperature of the interior thereof gradually rises bringing about an increase in the resistance of the temperature sensing resistor 52 housed in the probe 42. As the resistance of the temperature sensing resistor 52 is thus increased with the temperature thereof, the negative bias applied between the control grid 85 and the cathode 83 of the tube 80 is correspondingly increased, whereby the plate-cathode current of the tube 80 is correspondingly reduced, the reduction in the plate-cathode current of the tube 80 being substantially linear with the increase in the negative bias applied between the control grid 85 and the cathode 83 thereof, which increase in negative bias is substantially linear with the increase in resistance of the temperature sensing resistor 52, which increase in resistance of the temperature sensing resistor 52 is substantially linear with the increase in temperature thereof. As the plate-cathode current of the tube 80 is thus reduced, the voltage drop across the resistor 100 is correspondingly reduced in order to bring about a corresponding reduction in the negative bias applied between the control grid 89 and the cathode 87 of the tube 81, whereby the plate-cathode current of the tube 81 traversing the milliammeter 63 is correspondingly increased. The decrease in the negative bias applied between the control grid 89 and the cathode 87 of the tube 81 is substantially linear with the decrease in the voltage drop across the resistor 100; and the increase in the plate-cathode current of the tube 81 is substantially linear with the decrease in the negative bias applied between the control grid 89 and the cathode 87 thereof. Accordingly the current traversing the milliammeter 63 is substantially linearly proportional to the temperature of the temperature sensing resistor 52; whereby the meter 36 indicates directly the temperature of the temperature sensing resistor 52.

The presently employed meat scale 73 is matched to the temperature sensing resistor 52 by virtue of the position of the blade 94 engaging the meat contact in the associated contact bank, whereby the resistors 104 and 105 are included in the above-traced circuit establishing the negative bias between the control grid 85 and the cathode 83 of the tube 80. Accordingly the tube 80 functions as a voltage amplifier and the tube 81 functions as a power amplifier so that the milliammeter 63 is supplied a current in the range 4–24 milliamperes when the temperature of the sensing resistor 52 is in the range 120°–220° F. While the meat scale 73 is calibrated in terms of the temperature of the temperature sensing resistor 52, as explained above, the actual values of temperature in degrees F. are omitted from the scale 73 in order to avoid confusion on the part of the cook; and instead the legends "rare beef," etc., are substituted therefor. However, it will be understood that the midpoint of the meat scale 73 between the legends "veal" and "well-done beef" corresponds to the midpoint temperature of approximately 170° F. in the range 120°–220° F.

In view of the foregoing, it will be understood that as the temperature of the interior of the roast of meat 45 rises, the reading of the meter 36 increases, the indicator 65 moving across the meat scale 73 framed in the window 62 of the face plate 61, whereby the roast of meat 45 is completely cooked when the indicator 65 coincides with the legend on the meat scale 73 that matches both the character of the meat of the roast and the desired cooking condition thereof. For example, when the indicator 65 rides over the legend "veal" on the meat scale 73, a veal roast is completely cooked; whereby at this time the cook may return the oven switch 28 back into its off position, since the cooking operation has been completed. It will be understood that the other legends "lamb," etc., carried by the meat scale 73 correspond to the required interior cooking temperatures of the corresponding cuts of meat, whereby it is only necessary for the cook to permit the cooking operation to proceed until the indicator 65 coincides with the required legend carried by the meat scale 73 as explained above.

In view of the foregoing, it will be understood that in a similar manner, the electrical temperature indicating system is operative to indicate the temperature of a cooking operation that is carried out in the vessel 47 supported upon one of the hot plates 24, etc. In this example, the probe 42 is inserted into the food contained in the vessel 47 and the plug 43 is inserted into the receptacle 38 carried by the backsplash 13. The handle 76 of the circuit controller 37 is then set into the desired "fat" position or "candy" position corresponding to the cooking operation that is to be carried out in the vessel 47. Assuming that a candy cooking operation is to be carried out in the vessel 47 on the hot plate 24, the handle 76 is set into its "candy" position and the hot plate switch 29 is operated to effect heating of the hot plate 24 that supports the vessel 47. When the circuit controller 37 is set into its "candy" position, the blade 94 engages the candy contact in the associated contact bank short-circuiting the resistor 105 and completing a direct connection between the conductors 99 and 98, whereby the normal negative bias applied between the control grid 85 and the cathode 83 of the tube 80 is appropriately and correspondingly increased to effect matching of the temperature sensing resistor 52 and the candy scale 72 so that it is at this time framed in the window 62. The operation of the circuit control network is the same as that previously described, except that with the increased negative bias normally applied between the control grid 85 and the cathode 83 of the tube 80, the plate-cathode current of the tube 80 is reduced at a lower temperature range of the temperature sensing resistor 52 so as to match the temperature sensing resistor 52 to the candy scale 72, whereby the meter 36 reads substantially midscale when the temperature of the temperature sensing resistor 52 is at the midpoint temperature of 270° F. in the temperature range 220° to 320° F., the midpoint temperature noted corresponding to the temperature at which a "hard ball" candy cooking operation is normally carried out. Of course it will be understood that in carrying out a candy cooking operation the candy syrup being heated is maintained at the required temperature during an appropriate time interval in accordance with conventional practice.

In view of the above, it will be understood that a fat frying cooking operation may be carried out in the vessel 47 in a substantially identical manner while the probe 42 is immersed in the fat and the plug 43 is inserted into the receptacle 38. However, in this case the handle 76 of the circuit controller 37 is rotated into its "fat" position in order to bring about framing of the fat scale 71 in the window 62 and the engagement by the blade 94 of the fat contact in its associated contact bank. At this time the blade 94 engaging the fat contact in the associated contact bank short-circuits both of the resistors 104 and 105 completing a direct connection between the conductors 99 and 97 so as to effect the setting of a maximum negative bias between the control grid 85 and the cathode 83 of the tube 80 and the consequent matching of the temperature sensing resistor 52 and the fat scale 71. In this case the midpoint of the fat scale 71 corresponds substantially to the legend "fish" corresponding to a temperature of approximately 370° F., lying substantially in the midpoint of the range 320°–420° F.

In view of the foregoing description, it will be understood that a selecting movement of the manually operable handle 76 of the circuit controller 37 not only selects the required scale 71, etc., of the meter 36 framing it in the window 62, but it also simultaneously sets the blade 84 in order to set the appropriate negative bias between the control grid 85 and the cathode 83 of the tube 80, whereby the temperature sensing resistor 52 is matched against the selected scale 71, etc., in order that the meter 36 may read across the entire selected scale 71, etc., and so that the mid-temperature point of the selected scale 71, etc., corresponds to the mid-temperature range of the temperature sensing resistor 52 in carrying out the particular corresponding cooking operation.

Reconsidering the circuit network of Fig. 2, it is pointed out that while the tubes 80 and 81 of the respective types 12AV6 and 50C5 are constructed and arranged to have substantially flat plate current outputs with small variations in plate voltages within the normal operating ranges thereof, there is nevertheless a small increase in plate current in response to a reasonable increase in plate voltage from normal in each of these tubes, whereby a variation from normal voltage of the Edison source induces a small variation in the response of the meter 36 to measure the temperature of the temperature sensing resistor 52. In order to minimize this effect and further to hold substantially flat the plate current characteristics of the tubes 80 and 81 even though the voltage of the Edison source varies somewhat from normal, the ballast resistor 103 is arranged in the series heating circuit including the heaters 84 and 85 operatively associated with the respective cathodes 83 and 87 of the respective tubes 80 and 81. This arrangement employing the ballast resistor 103 having the high positive coefficient of resistance prevents any substantial increase in the current traversing the heaters 84 and 88 notwithstanding a reasonable increase in the voltage of the Edison source above normal, whereby the heater current remains substantially constant preventing increased electron emissions from the oxide coated cathodes 83 and 87 of the respective tubes 80 and 81 in response to increases in plate voltages. Accordingly it will be understood that this arrangement compensates for the small error that would be otherwise induced in the reading of the meter 36 when the voltage of the Edison source varies somewhat above normal.

In view of the foregoing, it is apparent that there has been provided in an electric range, an improved electrical temperature indicating system that is simple and efficient in operation permitting the cook to carry out a wide range of cooking operations both in the oven of the range and on a hot plate thereof, in an efficient and simple manner.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. An electric temperature indicating system comprising a single phase alternating current source of the three-wire Edison type including two outside conductors and a neutral conductor, a first resistor, a first electron discharge tube including an anode and a cathode and a grid, a connection via said first resistor between said neutral conductor and the anode of said first tube, a connection between one of said outside conductors and the grid of said first tube, a second resistor having a substantial positive temperature coefficient of resistance, a connection via said second resistor between said one outside conductor and the cathode of said first tube establishing a negative bias between the grid and the cathode of said first tube so that said negative bias is increased as the resistance of said second resistor is increased with the temperature thereof in order to reduce the current traversing said first resistor, a second electron discharge tube including an anode and a cathode and a grid, a connection between the other of said outside conductors and the anode of said second tube, a connection between said neutral conductor and the cathode of said second tube, a meter included in the anode-cathode circuit of said second tube and calibrated in terms of the temperature of said second resistor, and a connection via said first resistor between said neutral conductor and the grid of said second tube establishing a negative bias between the grid and the cathode of said second tube so that said last-mentioned negative bias is reduced as the current traversing said first resistor is reduced in order to increase the current traversing said meter.

2. An electric temperature indicating system comprising a single phase alternating current source of the three-wire Edison type including two outside conductors and a neutral conductor, a first resistor, a first electron discharge tube including an anode and a cathode and a grid, a connection via said first resistor between said neutral conductor and the anode of said first tube, a connection between said one outside conductor and the grid of said first tube, a second resistor having a substantial positive temperature coefficient of resistance, a third resistor, a connection via said second and third resistors in series relation between said one outside conductor and said neutral conductor, a connection between the junction of said second and third resistors and the cathode of said first tube establishing a negative bias between the grid and the cathode of said first tube so that said negative bias is increased as the resistance of said second resistor is increased with the temperature thereof in order to reduce the current traversing said first resistor, a second electron discharge tube including an anode and a cathode and a grid, a connection between the other of said outside conductors and the anode of said second tube, a connection between said neutral conductor and the cathode of said second tube, a meter included in the anode-cathode circuit of said second tube and calibrated in terms of the temperature of said second resistor, and a connection via said first resistor between said neutral conductor and the grid of said second tube establishing a negative bias between the grid and the cathode of said second tube so that said last-mentioned negative bias is reduced as the current traversing said first resistor is reduced in order to increase the current traversing said meter.

3. An electric temperature indicating system comprising a single phase alternating current source of the three-wire Edison type including two outside conductors and a neutral conductor, a first resistor, a first electron discharge tube including an anode and a cathode and a grid, a connection via said first resistor between said neutral conductor and the anode of said first tube, a connection between said one outside conductor and the grid of said first tube, a second resistor having a substantial positive temperature coefficient of resistance, a third resistor, a connection via said second and third resistors in series relation between said one outside conductor and the cathode of said first tube establishing a negative bias between the grid and the cathode of said first tube so that said negative bias is increased as the resistance of said second resistor is increased with the temperature thereof in order to reduce the current traversing said first resistor, means for selectively varying the resistance of said third resistor in order selectively to vary said negative bias and consequently the current traversing said first resistor, a second electron discharge tube including an anode and a cathode and a grid, a connection between the other of said outside conductors and the anode of said second tube, a connection between said neutral conductor and the cathode of said second tube, a meter included in the anode-cathode circuit of said second tube and calibrated in terms of the temperature of said second resistor, and a connection via said first resistor between said neutral conductor and the grid of said second tube establishing a negative bias between the grid and the cathode of said second tube so that said last-mentioned negative bias is reduced as the current traversing said first resistor is reduced in order to increase the current traversing said meter.

4. The electric temperature indicating system set forth in claim 1, and further comprising means for preventing the currents in the anode-cathode circuits of said first and second tubes from increasing proportionally with an increase in voltage above normal between said outside conductors.

5. The electric temperature indicating system set forth in claim 1, wherein the cathode of each of said first and second tubes is of the oxide-coated type and is provided with an associated cathode heater, and further comprises a cathode heater circuit including in series relation the cathode heaters of said first and second tubes and a ballast resistor having a high positive temperature coefficient of resistance.

6. The electric temperature indicating system set forth in claim 1, and further comprising a plug-connector carried by said second resistor and a plurality of socket-connectors included in said connection between said one outside conductor and the cathode of said first tube, each of said socket-connectors accommodating ready placement and removal of said plug-connector with respect thereto.

7. The electric temperature indicating system set forth in claim 2, wherein said meter is provided with first and second scales respectively calibrated in terms of first and second ranges of the temperature of said second resistor, and further comprising a switch having first and second settings respectively establishing first and second resistance values of said third resistor in order to set corresponding first and second negative biases so as to match said second resistor to said first and second scales, and manually operable means for selectively operating said switch into either one of its positions and for simultaneously selecting the corresponding one of said scales.

GEORGE W. SCHROEDER.

References Cited in the file of this patent

UNITED STATES PATENTS

| Number | Name | Date |
|---|---|---|
| 2,517,455 | Waters | Aug. 1, 1950 |
| 2,547,625 | Corson | Apr. 3, 1951 |

FOREIGN PATENTS

| Number | Country | Date |
|---|---|---|
| 389,383 | France | June 26, 1908 |
| 513,203 | France | Oct. 28, 1920 |